United States Patent
Aggarwal et al.

(10) Patent No.: US 11,537,970 B2
(45) Date of Patent: Dec. 27, 2022

(54) PROCESSING ORDER EXPERIENCE DATA ACROSS MULTIPLE DATA STRUCTURES

(71) Applicant: EMC IP Holding Company LLC, Hopkinton, MA (US)

(72) Inventors: Aditya Aggarwal, Bangalore (IN); Abhishek Mishra, Odisha (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 16/173,002

(22) Filed: Oct. 29, 2018

(65) Prior Publication Data
US 2020/0134533 A1  Apr. 30, 2020

(51) Int. Cl.
*G06Q 10/06* (2012.01)
*G06Q 30/00* (2012.01)
*G06Q 30/02* (2012.01)

(52) U.S. Cl.
CPC ..... *G06Q 10/06393* (2013.01); *G06Q 30/016* (2013.01); *G06Q 30/0282* (2013.01)

(58) Field of Classification Search
CPC .......... G06Q 10/06393; G06Q 30/016; G06Q 30/0282
USPC ...................................... 705/7.39
See application file for complete search history.

(56) References Cited

U.S. PATENT DOCUMENTS

| 6,292,784 B1* | 9/2001 | Martin | G06Q 10/06312 |
| | | | 705/7.21 |
| 7,937,334 B2 | 5/2011 | Bonissone et al. | |
| 2007/0083410 A1* | 4/2007 | Hanna | G06Q 10/0833 |
| | | | 705/333 |
| 2008/0270209 A1* | 10/2008 | Mauseth | G06Q 10/10 |
| | | | 705/7.29 |

(Continued)

OTHER PUBLICATIONS

Sallehudin, et al., Shipment Tracking for Air Freight via Website, Dissertation at Universiti Teknologi Petronas (UTP) (2004), available at http://utpedia.utp.edu.my/7698/1/2004%20-%20Shipment% 20Tracking%20for%20Air%20Freight%20via%20Website.pdf (Year: 2004).*

(Continued)

*Primary Examiner* — Charles Guiliano
(74) *Attorney, Agent, or Firm* — Ryan, Mason & Lewis, LLP

(57) ABSTRACT

Methods, apparatus, and processor-readable storage media for processing order experience data across multiple data structures are provided herein. An example computer-implemented method includes processing data, obtained from a first set of data structures, pertaining to orders placed with an enterprise, wherein the first set of data structures contains data associated with distinct portions of order transactions; extracting information pertaining to pre-defined attributes from the processed data and processing the extracted information into a second set of data structures; calculating order experience scores for the orders by applying at least one algorithm to the extracted information in the second set of (Continued)

data structures; generating at least one benchmark order experience value, wherein each benchmark order experience value is based at least in part on the calculated order experience scores; and performing operations related to order experience within the enterprise based at least in part on the benchmark order experience values.

20 Claims, 5 Drawing Sheets

(56) References Cited

U.S. PATENT DOCUMENTS

| | | | | |
|---|---|---|---|---|
| 2009/0138334 A1* | 5/2009 | Henby | ............ | G06Q 10/06375 |
| | | | | 705/7.37 |
| 2009/0192867 A1* | 7/2009 | Farooq | ............... | G06Q 30/0201 |
| | | | | 705/7.29 |
| 2017/0206592 A1* | 7/2017 | Chen | .................. | G06Q 30/0635 |

OTHER PUBLICATIONS

Wikipedia, Net Promoter, Oct. 22, 2018.
Cogdill et al. Beyond the 'Perfect Order' Index: Obtaining a True Measure of Customer Value, Aug. 2013.

* cited by examiner

PROCESSING ORDER EXPERIENCE DATA ACROSS MULTIPLE DATA STRUCTURES

FIELD

The field relates generally to information processing systems, and more particularly to techniques for processing order-related data across data structures in such systems.

BACKGROUND

Order experience (OEx or OE) can serve as a lens through which businesses or other enterprises monitor the other side of the sales spectrum. Namely, order experience represents the experience that is delivered to user and/or customers from the time a user and/or customer initiates orders and/or purchases a product or service to the time when the transaction is deemed completed, whether in a satisfactory or unsatisfactory capacity. Attempting to deliver a perfect order experience to every order in a given enterprise system can be difficult to achieve, however, as existing tools and approaches for measuring order experience are typically based on feedback solicited from the human users and/or customers. Accordingly, such feedback may not accurately reflect the true health of a given order experience, and moreover, such human feedback may not pertain to all of the components of an enterprise's order experience system.

Additionally, such human feedback, commonly obtained via customer satisfaction surveys, include participation challenges, wherein typically only a small percentage of users/customers actually respond to the surveys. Obtaining useful feedback for many orders via existing approaches, therefore, is a very expensive and implausible means of accurately capturing order experience data on a meaningful scale.

Further, conventional tools for measuring order experience do not include the ability to evaluate an order and/or transaction across large sets of pre-defined order experience components.

SUMMARY

Illustrative embodiments of the invention provide techniques for processing order experience data across multiple data structures. An exemplary computer-implemented method can include processing data, obtained from a first set of data structures, pertaining to multiple orders placed with an enterprise by one or more users, wherein the first set of data structures contains data associated with distinct portions of order transactions, and wherein processing the data is carried out without input from the one or more users. Such a method can also include extracting information pertaining to multiple pre-defined attributes from the processed data and processing the extracted information into a second set of data structures, and calculating order experience scores for the multiple orders based at least in part on applying at least one algorithm to the extracted information pertaining to the multiple pre-defined attributes in the second set of data structures. Further, such a method can additionally include generating at least one benchmark order experience value attributed to at least one portion of the enterprise, wherein the at least one benchmark order experience value is based at least in part on the calculated order experience scores, and performing one or more operations related to order experience within the enterprise based at least in part on the at least one benchmark order experience value.

Illustrative embodiments can provide significant advantages relative to conventional human survey-based arrangements. For example, challenges associated with incomplete and/or inaccurate survey results are overcome through the use of automated order data obtainment and processing. Such capturing and processing of order data via an order experience auditor system enables accurate and scalable monitoring of order experience information within an enterprise, as well as supplementary capabilities based thereon, leading to improved and efficient user experiences.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
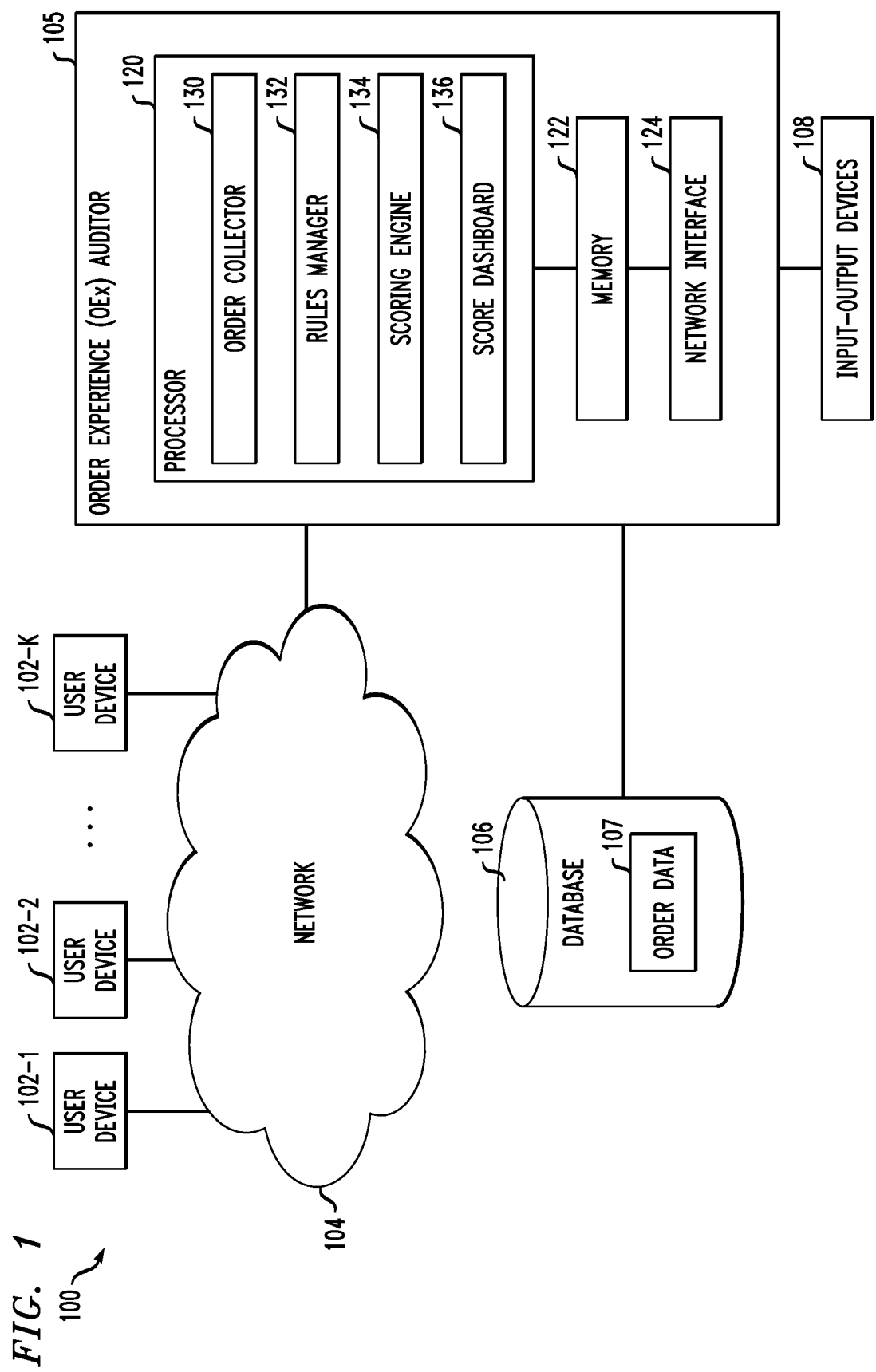
FIG. 1 shows an information processing system configured for order experience auditing in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is an order experience auditor 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Figure 3:
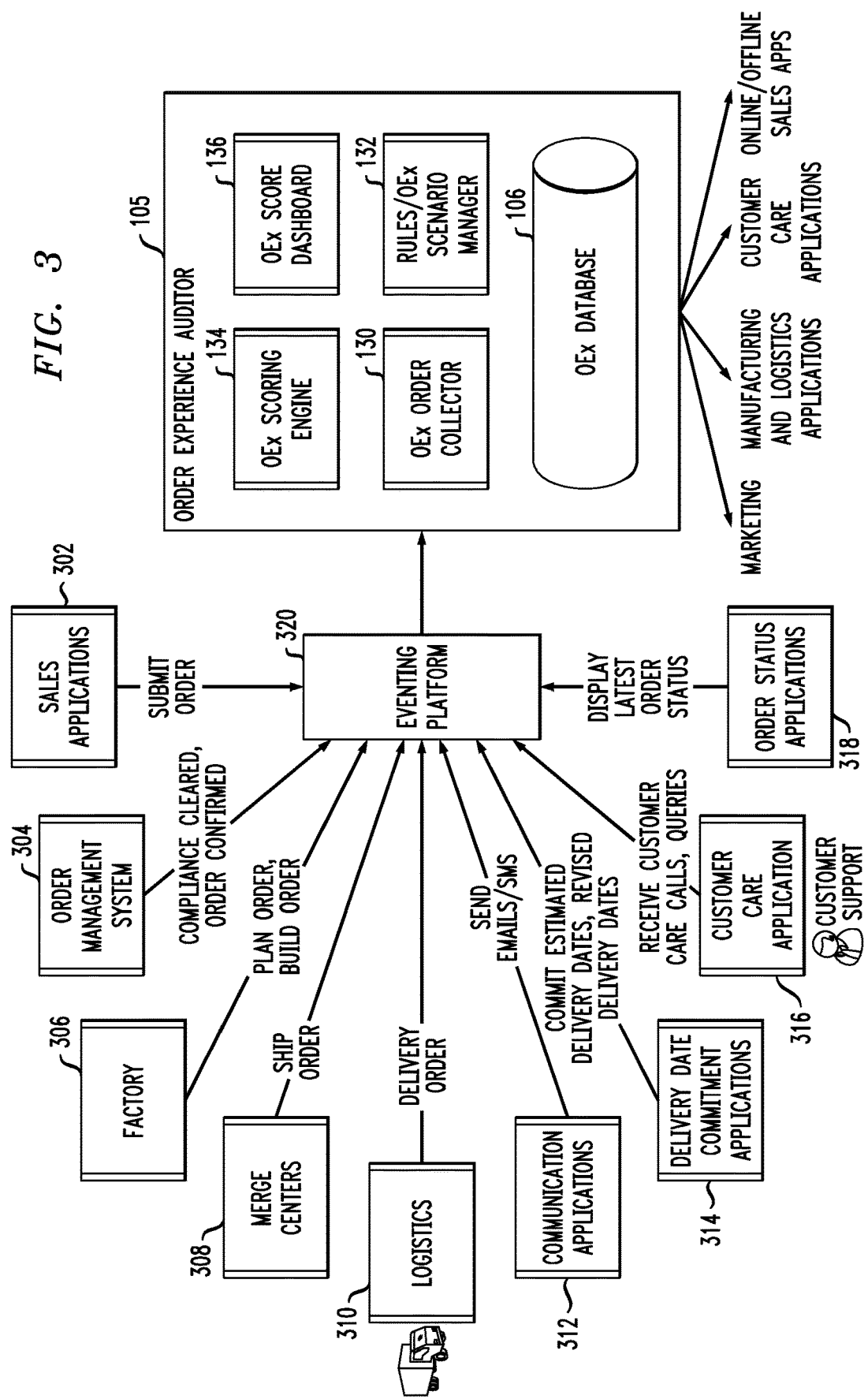
FIG. 3 shows system architecture of an order experience auditor in an illustrative embodiment of the invention.

The order experience auditor 105 has an associated database 106 configured to store order data 107 illustratively comprising data pertaining to enterprise orders derived from multiple distinct data structures associated with the enterprise's order experience system (such as, for example, depicted in FIG. 3).

The database 106 in the present embodiment is implemented using one or more storage systems associated with the order experience auditor 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the order experience auditor 105 are input-output devices 108, which illustratively comprise keyboards, displays or other types of input-output devices (such as web application programming interfaces (APIs), REST services, etc.) in any combination. Such input-output devices are used to support one or more user interfaces to the order experience auditor 105, as well as to support communication between the order experience auditor 105 and other related systems and devices not explicitly shown. The output of one or more embodiments of the invention (that is, an OEx score) can also be fed to one or more other client systems, which can then take one or more respective actions based at least in part on the provided OEx score.

The order experience auditor 105 in the FIG. 1 embodiment is assumed to be implemented using at least one processing device. Each such processing device generally comprises at least one processor and an associated memory, and implements one or more functional modules for controlling certain features of the order experience auditor 105.

More particularly, the order experience auditor 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the order experience auditor 105 to communicate over the network 104 with the user devices 102, and illustratively comprises one or more conventional transceivers.

The processor 120 further comprises an order collector 130, a rules manager 132, a scoring engine 134 and a score dashboard 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the order collector 130, rules manager 132, scoring engine 134 and score dashboard 136 may be implemented at least in part in the form of software that is stored in memory 122 and executed by processor 120.

It is to be understood that the particular set of elements shown in FIG. 1 for order experience auditing involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the order experience auditor 105 can be eliminated and associated elements such as order collector 130, rules manager 132, scoring engine 134 and score dashboard 136 can be implemented elsewhere in the computer network 100.

An exemplary process utilizing order collector 130, rules manager 132, scoring engine 134 and score dashboard 136 of the order experience auditor 105 in computer network 100 will be described in more detail with reference to the flow diagram of FIG. 4.

Figure 2:
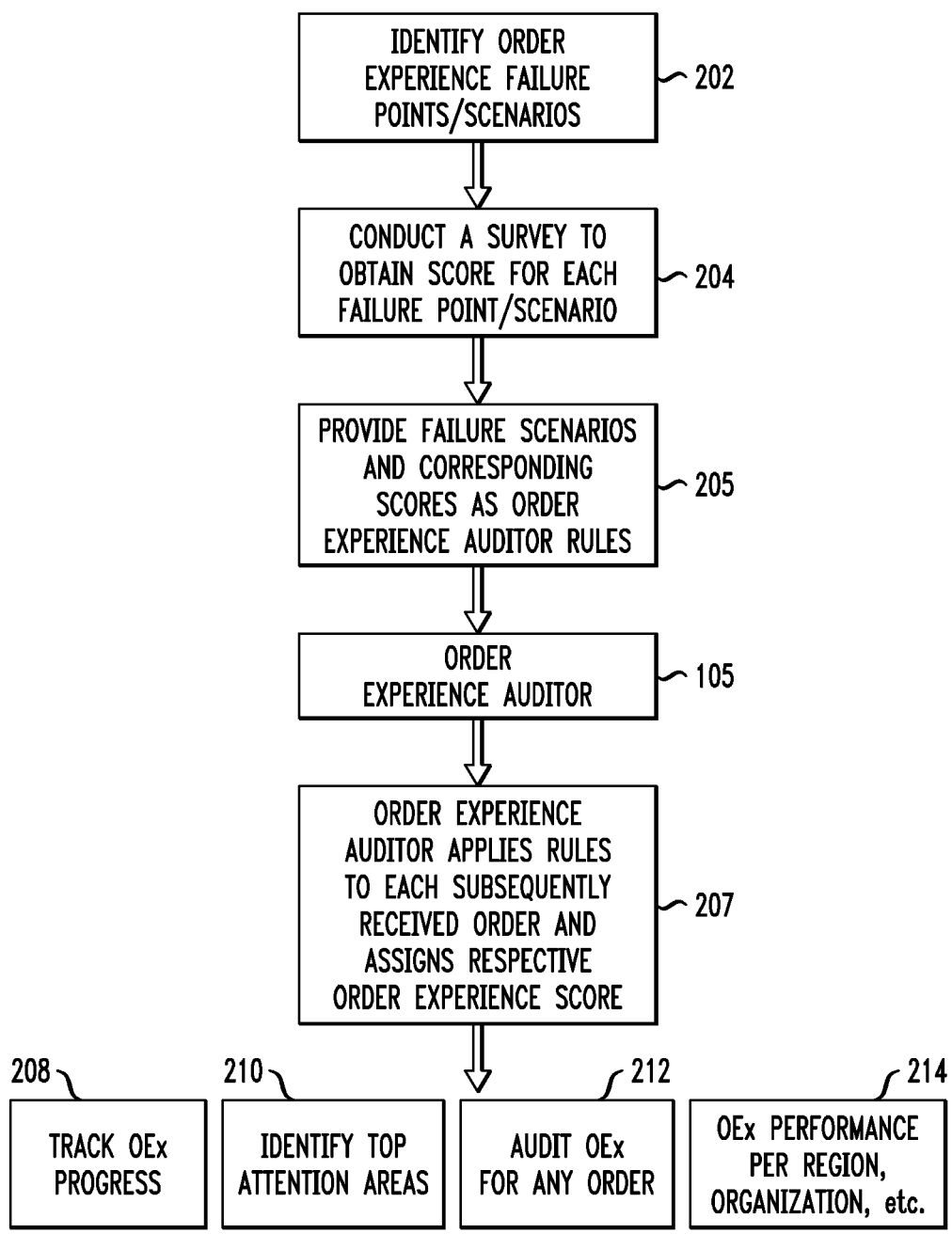
FIG. 2 shows an example workflow utilizing an order experience auditor in an illustrative embodiment of the invention.

FIG. 2 shows an example workflow utilizing an order experience auditor in an illustrative embodiment of the invention. By way of illustration, step 202 includes identifying order experience failure points and/or scenarios. In one or more embodiments of the invention, failure points (for example, such points that need to be evaluated and considered) can be identified by an order experience expert and/or business users of the tool detailed herein.

Step 204 includes conducting one or more user/customer surveys to determine scores (negative weightage scores, for example) for each identified failure point and/or scenario. Such a survey can, for example, present the failure scenarios and prompt the audience to provide a negative score (for example, out of 100 points) for each of the scenarios. By way of example, survey questions might include the following:

1. How many points should be reduced (out of 100) if your order is delivered later than 10-20 days compared to the estimated delivery date committed at the time of order placement/confirmation?
2. How many points should be reduced (out of 100) if your order was cancelled due to any reason that is purely internal to the organization?
3. How many points should be reduced (out of 100) if your order was not processed and confirmed within ten minutes of order placement?
4. How many points should be reduced (out of 100) if you did not receive any communication regarding confirmation of the order placed?

The scores provided in response to such survey questions can then be averaged and fed into the order experience auditor 105 as order experience auditor rules, as indicated via step 205. Additionally, in one or more embodiments of the invention, the survey can be conducted and failure scenarios can be generated and presented differently for different geographies and/or customer segments. For example, early deliveries may be considered beneficial by retail customer but not by commercial customers. Further, in one or more embodiments of the invention, surveys can be updated with new scenarios and/or fluctuating customer sentiment.

The order experience auditor 105, as indicated via step 207, can apply the rules to each subsequent order received by the system and assign the respective OE score to the given transaction/order. Additionally, based at least on such created failure scenarios and corresponding score assignments, the order experience auditor 105 can calculate an OEx score for each order in the system.

Based on such calculated OEx scores, at least one embodiment of the invention can additionally include performing operations such as tracking OEx progress 208 across one or more portions of the enterprise, identifying top attention areas 210 related to order experience within the enterprise, auditing OEx for any order 212, and monitoring and/or assessing OEx performance for customer or enterprise segments 214 such as geographic region, business unit, etc. Accordingly, one or more embodiments of the invention can include creating multiple customer segments, conducting surveys over the customer segments (for example, using hypothetical scenarios), and applying the survey scores/results to subsequent real-world orders/transactions to create order experience scores without customer feedback.

By way merely of illustration, in at least one embodiment of the invention, the order experience auditor 105 can assume that a perfect order will have a score of 100. The order experience auditor 105 analyzes order-related data derived from multiple distinct data structures and measures positive and negative aspects of the order experience with respect to an order.

Additionally, in one or more embodiments of the invention, the order experience auditor 105 can enable experience disruption scenarios and/or rules to be defined based on certain order attributes, and can subsequently assign an OEx score for each such scenario based on the impact that disruption can cause. This negative OEx score can be set specifically for certain business segments, target markets, geographic regions, user personas, etc.

FIG. 3 shows system architecture of an order experience auditor in an illustrative embodiment of the invention. By way of illustration, FIG. 3 depicts various distinct data structures containing data related to one or more aspects of an enterprise's order experience system. For example, FIG. 3 specifically depicts a sales applications data structure 302, which outputs submitted order data to an eventing platform 320, and an order management system data structure 304, which outputs compliance data and order confirmation data to the eventing platform 320. Also, a factory data structure 306 provides plan order and build order data to the eventing platform 320, a merge centers data structure 308 provides shipping order data to the eventing platform 320, and a logistics data structure 310 provides order delivery data to the eventing platform 320. Additionally, a communication applications data structure 312 provides communication data (such as email data, short message service (SMS) data, etc.) to the eventing platform 320, and a delivery data commitment application data structure 314 provides estimated delivery data and/or revised delivery data to the eventing platform. Further, a customer care application data structure 316 provides customer care call and query data to the eventing platform 320, and an order status application data structure 318 provides order status data to the eventing platform. The eventing platform 320 is responsible, in such an example embodiment, for receiving events from various applications and/or data structures and consolidating such events and order information into a single order object/view. Accordingly, the eventing platform 320 can act as a foundation for the OE Auditor 105 to evaluate each order on all experience scenarios.

As also depicted in FIG. 3, the eventing platform 320 provides data processed from the above-noted data structures to the order experience auditor 105, which processes various order attributes required to measure the realization of multiple order experience components. Additionally, the order experience auditor 105 can trace the order experience for each order in the system against the list of all pre-defined OE disruption scenarios. For each disruption identified in an order, the order experience auditor 105 can reduce the respective order experience score for the order. Accordingly, in one or more embodiments of the invention, the order experience auditor 105 can thus maintain, in one or more data structures within database 106, an order experience score for every order in the system.

In at least one embodiment of the invention, the order experience auditor 105 can require certain attributes of an order to be recorded against which experience disruption scenarios can be defined and scored, respectively. Examples of attributes that can be required to measure the OE score for any order can include delivery commitment attributes including original estimated delivery date (minimum) at the time of order submission; original estimated delivery date (maximum) at the time of order submission; original estimated ship date at the time of order submission; revised delivery date (minimum) when the order misses the latest estimated ship date; revised delivery date (maximum) when the order misses the latest estimated ship date; revised ship date when the order misses latest estimated ship date; number of times an estimated delivery and/or ship date for the order was revised; promised delivery date of the order; must arrive by date of the order; actual ship date of the order; and actual delivery date of the order.

Additionally, examples of attributes that can be required to measure the OE score for any order can also include order processing performance attributes including a timestamp when the actual delivery date was received by the enterprise from the shipping carrier; timestamp when the order was booked in system; timestamp when the order cleared all compliance holds (customer, payment, fraud, trade, etc.); timestamp when the order was ready for fulfillment; timestamp when the order entered pre-production (Pp) planning state; timestamp when the order entered in-production (Ip)

state; timestamp when the order entered ship confirmed (Sc) state; timestamp when the order entered manufactured (Mn) state; timestamp when the order entered service tag attached (Tg) state; timestamp when the order was invoiced; timestamp when the order was closed; last status of the order that was recorded; and timestamp when an order cancellation was requested.

Also, examples of attributes that can be required to measure the OE score for any order can include order cancellation attributes including the timestamp when the order cancellation was completed; cancellation reason recorded at the time of the cancellation request; cancellation reason recorded at the time of cancellation confirmation; and order identifier of the new order in case the order was cancelled and rebooked. Examples of attributes that can be required to measure the OE score for any order can additionally include order communications attributes including order preference for order acknowledgement (ack) email communication; order preference for order confirmation email communication; order preference for order shipped email communication; order preference for order cancellation email communication; timestamp when the order acknowledgement email communication was successfully sent; timestamp when the order confirmation email communication was successfully sent; timestamp when the order shipped email communication was successfully sent; timestamp when the order cancellation rejection email communication was successfully sent; timestamp when the order cancellation acceptance email communication was successfully sent; timestamp when the order confirmation email was opened and read by the customer; and timestamp when the order shipped email was opened and read by the customer.

Examples of attributes that can be required to measure the OE score for any order can also include order returns attributes, including timestamp when return for an order was initiated; timestamp when return for an order was completed; and timestamp when refunds for a return for an order were credited to user's account. Additional examples of attributes that can be required to measure the OE score for any order can include order status attributes, which can include timestamp when the order was queried on an order status page but no status was provided, and a tracking link for the order, as well as customer care attributes, which can include the number of times the customer called customer care to inquire about the order, and the sum of the durations of all customer care calls received for the order.

Additionally, in one or more embodiments of the invention, the following order attributes can be required to be captured to process and/or store the order experience scores into various categories and/or data structures: order number assigned to the order by the order management system; order identifier given to the customer at the time of order submission; quote number from which order was created (if any); business unit of the order; country code of the order; company number and/or sales channel to which the order is associated; date when the order was submitted; source application that created the order; source order management system for the order; type of order; order amount; sales representative (salesrep) number associated with the order; salesrep email associated with the order; currency of the order; ship method associated with the order; payment method for the order; billing customer number for the order; billing email address for the order; shipping customer number for the order; shipping email address for the order; sold to customer number for the order; sold to email address for the order; base customer number for the order; and base email address for the order.

As also detailed herein, one or more embodiments of the invention include implementing rules for scoring. In an example embodiment, using the order attributes and order experience attributes captured for an order, order experience disruption scenarios and/or rules can be defined, and for each rule, an OEx score can be set based on the disruption impact. Note that in at least one embodiment, the number of points to be deducted for an order experience can be based, for example, on surveys conducted on sample audiences that identify the target market for the enterprise and/or business unit.

Additionally, one or more embodiments of the invention can include incorporating and/or implementing rules within rule categories such as original delivery commitment rules (including rules pertaining to the number of days by which an order was late or early), order status accuracy/order visibility rules (including rules pertaining to the timing of proof of delivery receipt), order processing performance rules, order communications rules (including rules pertaining to various email failures), order cancellation rules, delivery commitment revision rules, order return rules, communications rules, and customer care rules.

As more order experience attributes are captured in an order, more scenarios and/or rules can be defined. For each order that gets cancelled, closed, delivered, invoiced, etc. in the system, the order experience auditor can assess each of the OEx disruption rules against the order and reduce the respective disruption points from the order experience score of the order. In one or more embodiments of the invention, the OE auditor can also score orders which are not yet closed, delivered, cancelled, invoiced, etc. In such an embodiment, the OE auditor can score each order in the system as soon as the order is submitted, and then at one or more designated order events or at one or more periodic intervals in time (for example, every one hour) so that the order experience score is available for all orders in the system, even for those which are not yet closed.

Additionally, in at least one embodiment of the invention, a perfect order, which does not face any order experience disruptions, is considered to have an OEx score of 100. It is also possible that an order can have a negative OE score because an order may undergo more than one experience disruption.

Accordingly, in one or more embodiments of the invention, an order experience score for an order can be calculated via the following formula:

$$\text{Order's } OEx \text{ Score} = 100 - \sum_{1}^{n} \frac{OEx \text{ Score}}{\text{Reduction}}$$

Using such a formula, the lower the OEx score, the poorer the order experience delivered, while the higher the OEx Score (with the maximum being 100), the better the order experience delivered. Additionally, as detailed herein, the order experience auditor can calculate and store (in one or more data structures) the order experience score for each order in the system. Further, in at least one embodiment of the invention, the order experience auditor can offer a timeline view for each order, pictorially depicting the order journey and any disruption points.

Using order experience scores for all orders, one or more embodiments of the invention can including calculating the order experience score for an entire organization, geographic region, business unit, sales channel, etc. The OEx score(s) can also be, for example, rolled-up to a sales representative as well, such that the sales representative can monitor the order experience being delivered to his or her orders and/or customers. Also, by way of example, the sum aggregate of all OE scores, measured as a percentage, for all orders for a given duration of time can be utilized to define the overall order experience score for an enterprise as a whole.

For example, the OE score for a particular business unit within the enterprise can thus be calculated as per the following formula: Order Experience Score for a BU= ((ΣOEx Score for BU)/(Count of Orders for BU×100))×100.

Additionally, OE scores, when plotted, for example, on a daily basis, can provide a view of the growth and/or decline in the order experience being delivered to customers. Also, as detailed herein, OE scores can be grouped for a region, country, segment, business unit, or even sales representative to realize the OEx trend for any such particular area of attention. In one or more embodiments of the invention, necessary and/or desired actions can then be taken to maintain the order experience trend or improve the order experience.

When grouped by customer, the average order experience score per order can be used to determine a customer experience score. The customer experience score can be used, for example, as an indicator to promote cross-sales, to send campaigns to customers with high customer experience scores, and to send coupons and/or distress management communications to dissatisfied customers with low customer experience scores. By way of example, such a customer score can be determined via the following equation: OEx Score for customer=((ΣOEx Score for Orders placed by Customer)/(Count of Customer Orders×100))×100. Additionally, based on the customer experience scores, customers may be classified and/or segmented into groups based on assumed/perceived customer satisfaction.

As depicted, for example, in FIG. 3, customer experience scores can be provided to various sales and order management applications to derive various experiences for the customer. For example, one or more embodiments of the invention can include manually handling orders for very unhappy customers and ensuring higher order experience scores for such customers. Such an embodiment can also, for example, automatically prioritize orders for unhappy customers, initiate marketing campaigns for very happy customers, and push cross-sales and/or up-sales for happy customers.

Figure 4:
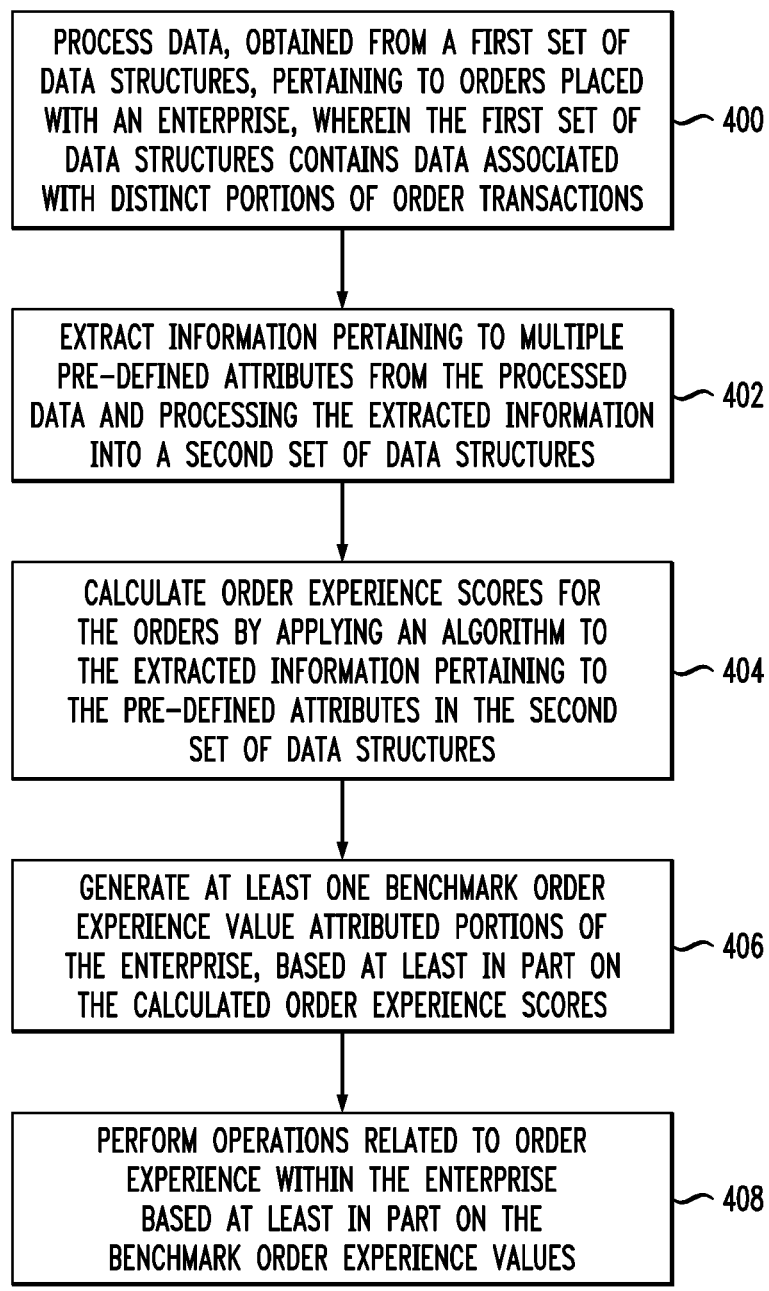
FIG. 4 is a flow diagram of a process for order experience auditing in an illustrative embodiment.

FIG. 4 is a flow diagram of a process for order experience auditing in an illustrative embodiment. It is to be understood that this particular process is only an example, and additional or alternative processes can be carried out in other embodiments.

In this embodiment, the process includes steps 400 through 408. These steps are assumed to be performed by the processor 120 utilizing its modules 130, 132, 134 and 136.

Step 400 includes processing data, obtained from a first set of data structures, pertaining to multiple orders placed with an enterprise by one or more users, wherein the first set of data structures contains data associated with distinct portions of order transactions, and wherein processing the data is carried out without input from the one or more users.

Step 402 includes extracting information pertaining to multiple pre-defined attributes from the processed data and processing the extracted information into a second set of data structures. The pre-defined attributes can include, for example, attributes pertaining to delivery commitment, order processing performance, order cancellation, order communications, order returns, order status, customer care, and/or delivery commitment revision.

Additionally, at least one embodiment of the invention includes attributing a value to each of the multiple pre-defined attributes, wherein the attributed value is based at least in part on an order experience disruption impact associated with the attribute. Additionally, the attributed value can include a negative weightage scale assigned to the attribute. Further, one or more embodiments of the invention can include updating the multiple pre-defined attributes (for example, adding an attribute, removing an attribute, and/or modifying an attribute).

Step 404 includes calculating order experience scores for the multiple orders based at least in part on applying at least one algorithm to the extracted information pertaining to the multiple pre-defined attributes in the second set of data structures. Step 406 includes generating at least one benchmark order experience value attributed to at least one portion of the enterprise, wherein the at least one benchmark order experience value is based at least in part on the calculated order experience scores.

Step 408 includes performing one or more operations related to order experience within the enterprise based at least in part on the at least one benchmark order experience value. Performing the one or more operations can include tracking order experience progress across the enterprise for a pre-determined period of time. Additionally, performing the one or more operations can include identifying one or more of the multiple pre-defined attributes, representing one or more aspects of an order experience cycle, requiring remedial action by the enterprise. Further, performing the one or more operations can include monitoring order experience of one or more subsequent orders in approximately real-time, as well as determining order experience performance for one or more segments of users, one or more geographic regions, one or more groups within the enterprise, etc.

Accordingly, the particular processing operations and other functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

Additionally, the above-described illustrative embodiments provide significant advantages relative to conventional approaches.

For example, some embodiments are configured to provide order experience scores for all orders in near real-time. These and other embodiments can effectively enable the tracking of satisfied versus dissatisfied customers in near real-time, can identify the top areas of investment for improving order experience, can be configured for any specific customer segment (customer type, geography, etc.), and can allow for future disruptions scenarios (such as purchase experience, quality of products, pricing, etc.) to be defined and added to the scoring mechanism at any given time.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
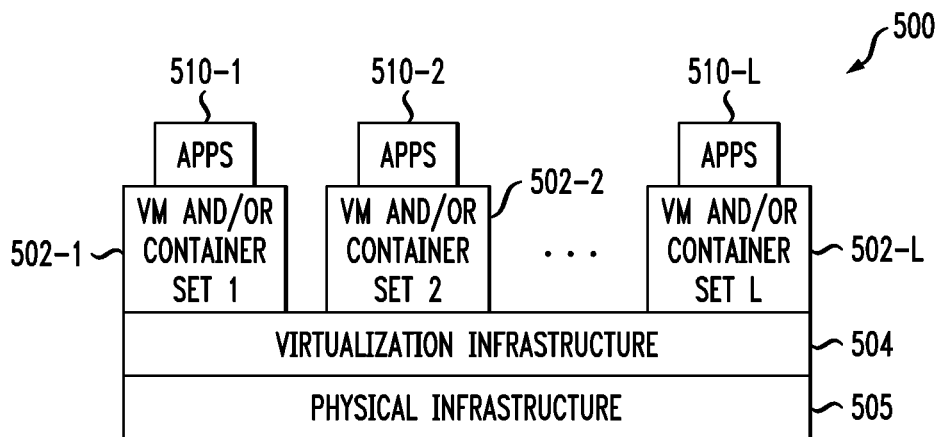
FIGS. 5 and 6 show examples of processing platforms that may be utilized to implement at least a portion of an information processing system in illustrative embodiments.
Figure 6:
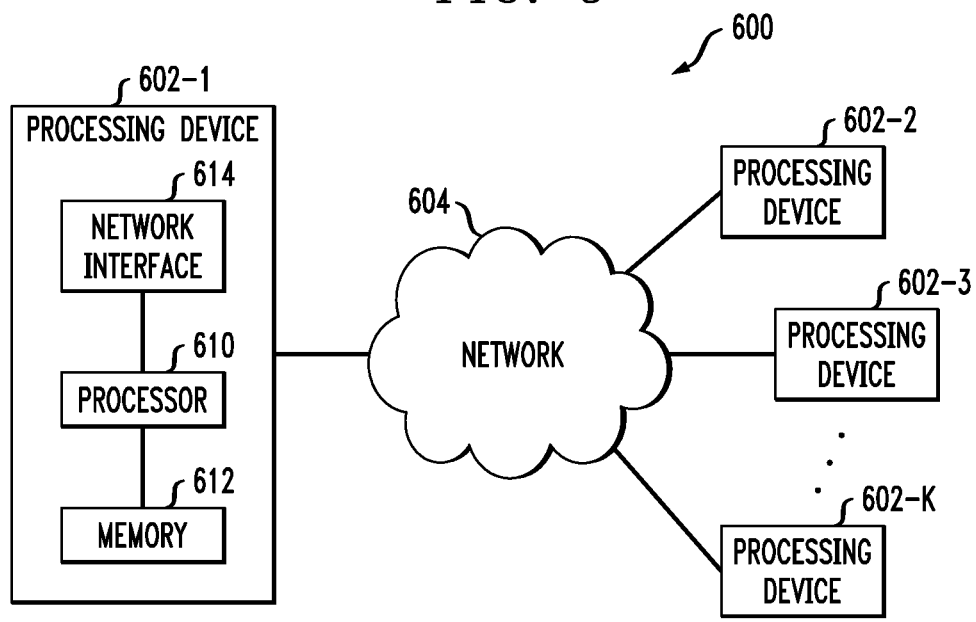

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used.

For example, the disclosed techniques are applicable to a wide variety of other types of information processing systems in which it is desirable to provide accurate and improved order experience assessment and processing. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:

processing data, obtained from a first set of data structures, pertaining to multiple orders placed with an enterprise by one or more users, wherein the first set of data structures contains multiple data structures, each comprising data, parsed from at least one set of order transactions data, associated with one or more distinct respective portions of the order transactions, and wherein processing the data is carried out, without input from the one or more users, by an eventing platform and comprises consolidating at least a portion of the obtained data into a single order view, enabling performance of scalable operations with respect to orders in connection with the enterprise;

extracting information pertaining to multiple pre-defined attributes from the processed data and processing the extracted information into a second set of data structures, wherein the multiple pre-defined attributes comprise (a) one or more attributes pertaining to delivery commitment comprising at least one of an earliest estimated delivery date indicated at the time of order submission and a latest estimated delivery date indicated at the time of order submission, (b) one or more attributes pertaining to order processing performance comprising one or more order-related timestamps, (c) one or more attributes pertaining to order cancellation comprising one or more cancellation reasons, (d) one or more attributes pertaining to order-related communication preferences comprising at least one of a preference for an order acknowledgement communication medium, a preference for an order confirmation communication medium, a preference for an order shipped notification communication medium, and a preference for an order cancellation communication medium, (e) one or more attributes pertaining to order returns comprising one or more return-related timestamps, (f) one or more attributes pertaining to order status comprising order tracking information, and (g) one or more attributes pertaining to customer care comprising information pertaining to one or more customer inquiries pertaining to an order;

determining a negative weightage scale for at least a portion of the multiple pre-defined attributes by querying multiple users, via one or more dynamic user interfaces, pertaining to order experience issues;

attributing a value to each of the multiple pre-defined attributes, wherein the value attributed to each of the multiple pre-defined attributes is based at least in part on the negative weightage scale assigned to the given attribute;

calculating order experience scores for the multiple orders based at least in part on applying at least one algorithm to at least one of the extracted information pertaining to the multiple pre-defined attributes in the second set of data structures and the value attributed to each of the multiple pre-defined attributes;

generating at least one benchmark order experience value attributed to at least one portion of the enterprise, wherein the at least one benchmark order experience value is based at least in part on the calculated order experience scores; and performing one or more operations related to order experience within the enterprise based at least in part on the at least one benchmark order experience value, wherein performing one or more operations comprises:
  automatically generating, using at least one web application programming interface, one or more pictorial representations of one or more dynamic order timeline views comprising one or more disruption points; and
  automatically updating, on a predetermined temporal basis and using the at least one web application programming interface, at least a portion of the one or more pictorial representations of the one or more dynamic order timeline views;

wherein the method is performed by at least one processing device comprising a processor coupled to a memory.

2. The computer-implemented method of claim 1, wherein the value attributed to each of the multiple pre-defined attributes is based at least in part on an order experience disruption impact associated with the attribute.

3. The computer-implemented method of claim 1, further comprising:
  updating the multiple pre-defined attributes.

4. The computer-implemented method of claim 1, wherein performing the one or more operations comprises monitoring order experience of one or more subsequent orders in approximately real-time.

5. The computer-implemented method of claim 1, wherein performing the one or more operations comprises tracking order experience progress across the enterprise for a pre-determined period of time.

6. The computer-implemented method of claim 1, wherein performing the one or more operations comprises identifying one or more of the multiple pre-defined attributes, representing one or more aspects of an order experience cycle, requiring remedial action by the enterprise.

7. The computer-implemented method of claim 1, wherein performing the one or more operations comprises determining order experience performance for one or more segments of users.

8. The computer-implemented method of claim 1, wherein performing the one or more operations comprises determining order experience performance for one or more geographic regions.

9. The computer-implemented method of claim 1, wherein performing the one or more operations comprises determining order experience performance for one or more groups within the enterprise.

10. A non-transitory processor-readable storage medium having stored therein program code of one or more software programs, wherein the program code when executed by at least one processing device causes the at least one processing device:
  to process data, obtained from a first set of data structures, pertaining to multiple orders placed with an enterprise by one or more users, wherein the first set of data structures contains multiple data structures, each comprising data, parsed from at least one set of order transactions data, associated with one or more distinct respective portions of the order transactions, and wherein processing the data is carried out, without input from the one or more users, by an eventing platform and comprises consolidating at least a portion of the obtained data into a single order view, enabling performance of scalable operations with respect to orders in connection with the enterprise;
  to extract information pertaining to multiple pre-defined attributes from the processed data and processing the extracted information into a second set of data structures, wherein the multiple pre-defined attributes comprise (a) one or more attributes pertaining to delivery commitment comprising at least one of an earliest estimated delivery date indicated at the time of order submission and a latest estimated delivery date indicated at the time of order submission, (b) one or more attributes pertaining to order processing performance comprising one or more order-related timestamps, (c) one or more attributes pertaining to order cancellation comprising one or more cancellation reasons, (d) one or more attributes pertaining to order-related communication preferences comprising at least one of a preference for an order acknowledgement communication medium, a preference for an order confirmation communication medium, a preference for an order shipped notification communication medium, and a preference for an order cancellation communication medium, (e) one or more attributes pertaining to order returns comprising one or more return-related timestamps, (f) one or more attributes pertaining to order status comprising order tracking information, and (g) one or more attributes pertaining to customer care comprising information pertaining to one or more customer inquiries pertaining to an order;

to determine a negative weightage scale for at least a portion of the multiple pre-defined attributes by querying multiple users, via one or more dynamic user interfaces, pertaining to order experience issues;

to attribute a value to each of the multiple pre-defined attributes, wherein the value attributed to each of the multiple pre-defined attributes is based at least in part on the negative weightage scale assigned to the given attribute;

to calculate order experience scores for the multiple orders based at least in part on applying at least one algorithm to at least one of the extracted information pertaining to the multiple pre-defined attributes in the second set of data structures and the value attributed to each of the multiple pre-defined attributes;

to generate at least one benchmark order experience value attributed to at least one portion of the enterprise, wherein the at least one benchmark order experience value is based at least in part on the calculated order experience scores; and to perform one or more operations related to order experience within the enterprise based at least in part on the at least one benchmark order experience value, wherein performing one or more operations comprises:

automatically generating, using at least one web application programming interface, one or more pictorial representations of one or more dynamic order timeline views comprising one or more disruption points; and automatically updating, on a predetermined temporal basis and using the at least one web application programming interface, at least a portion of the one or more pictorial representations of the one or more dynamic order timeline views.

11. The non-transitory processor-readable storage medium of claim 10, wherein performing the one or more operations comprises identifying one or more of the multiple pre-defined attributes, representing one or more aspects of an order experience cycle, requiring remedial action by the at least one enterprise.

12. The non-transitory processor-readable storage medium of claim 10, wherein performing the one or more operations comprises determining order experience performance for at least one of one or more segments of users, one or more geographic regions, and one or more groups within the at least one enterprise.

13. The non-transitory processor-readable storage medium of claim 10, wherein the value attributed to each of the multiple pre-defined attributes is based at least in part on an order experience disruption impact associated with the attribute.

14. The non-transitory processor-readable storage medium of claim 10, wherein performing the one or more operations comprises monitoring order experience of one or more subsequent orders in approximately real-time.

15. The non-transitory processor-readable storage medium of claim 10, wherein performing the one or more operations comprises tracking order experience progress across the enterprise for a pre-determined period of time.

16. An apparatus comprising:

at least one processing device comprising a processor coupled to a memory;

the at least one processing device being configured:

to process data, obtained from a first set of data structures, pertaining to multiple orders placed with an enterprise by one or more users, wherein the first set of data structures contains multiple data structures, each comprising data, parsed from at least one set of order transactions data, associated with one or more distinct respective portions of the order transactions, and wherein processing the data is carried out, without input from the one or more users, by an eventing platform and comprises consolidating at least a portion of the obtained data into a single order view, enabling performance of scalable operations with respect to orders in connection with the enterprise;

to extract information pertaining to multiple pre-defined attributes from the processed data and processing the extracted information into a second set of data structures, wherein the multiple pre-defined attributes comprise (a) one or more attributes pertaining to delivery commitment comprising at least one of an earliest estimated delivery date indicated at the time of order submission and a latest estimated delivery date indicated at the time of order submission, (b) one or more attributes pertaining to order processing performance comprising one or more order-related timestamps, (c) one or more attributes pertaining to order cancellation comprising one or more cancellation reasons, (d) one or more attributes pertaining to order-related communication preferences comprising at least one of a preference for an order acknowledgement communication medium, a preference for an order confirmation communication medium, a preference for an order shipped notification communication medium, and a preference for an order cancellation communication medium, (e) one or more attributes pertaining to order returns comprising one or more return-related timestamps, (f) one or more attributes pertaining to order status comprising order tracking information, and (g) one or more attributes pertaining to customer care comprising information pertaining to one or more customer inquiries pertaining to an order;

to determine a negative weightage scale for at least a portion of the multiple pre-defined attributes by querying multiple users, via one or more dynamic user interfaces, pertaining to order experience issues;

to attribute a value to each of the multiple pre-defined attributes, wherein the value attributed to each of the multiple pre-defined attributes is based at least in part on the negative weightage scale assigned to the given attribute;

to calculate order experience scores for the multiple orders based at least in part on applying at least one algorithm to at least one of the extracted information pertaining to the multiple pre-defined attributes in the second set of data structures and the value attributed to each of the multiple pre-defined attributes;

to generate at least one benchmark order experience value attributed to at least one portion of the enterprise, wherein the at least one benchmark order experience value is based at least in part on the calculated order experience scores; and to perform one or more operations related to order experience within the enterprise based at least in part on the at least one benchmark order experience value, wherein performing one or more operations comprises:

automatically generating, using at least one web application programming interface, one or more pictorial representations of one or more dynamic order timeline views comprising one or more disruption points; and automatically updating, on a predetermined temporal basis and using the at least one web application programming interface, at least a portion of the one or more pictorial representations of the one or more dynamic order timeline views.

17. The apparatus of claim 16, wherein performing the one or more operations comprises identifying one or more of the multiple pre-defined attributes, representing one or more aspects of an order experience cycle, requiring remedial action by the at least one enterprise.

18. The apparatus of claim 16, wherein performing the one or more operations comprises determining order experience performance for at least one of one or more segments of users, one or more geographic regions, and one or more groups within the at least one enterprise.

19. The apparatus of claim 16, wherein the value attributed to each of the multiple pre-defined attributes is based at least in part on an order experience disruption impact associated with the attribute.

20. The apparatus of claim 16, wherein performing the one or more operations comprises monitoring order experience of one or more subsequent orders in approximately real-time.

* * * * *